Nov. 26, 1946.    J. M. KERWIN ET AL    2,411,734
COLD WORKED HOLLOW STEM VALVE
Original Filed March 11, 1942    2 Sheets-Sheet 1
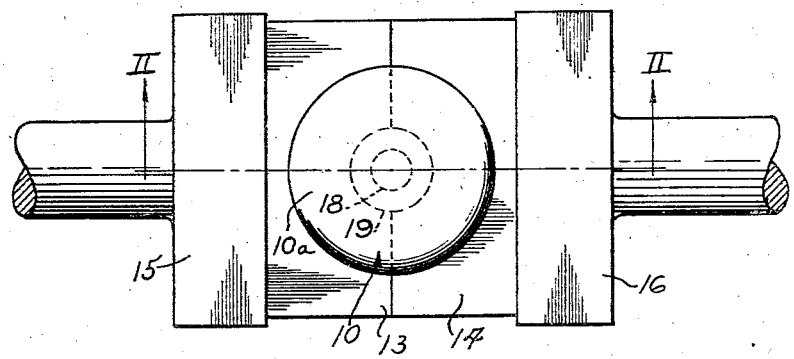
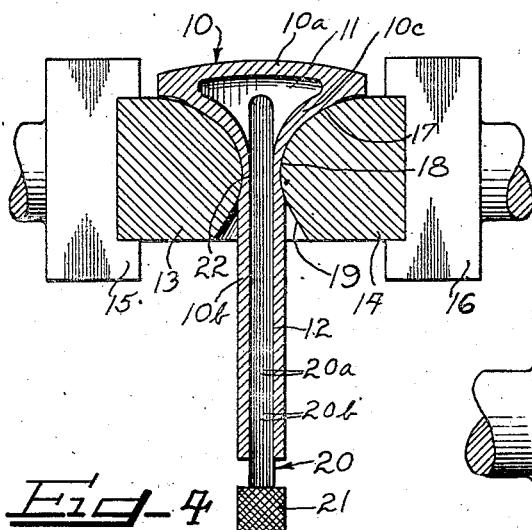
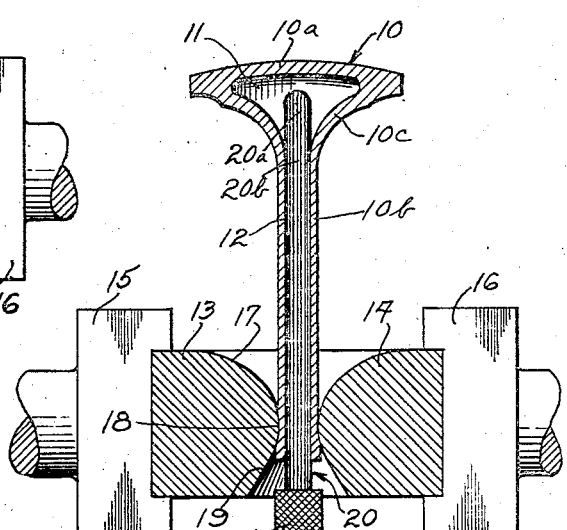
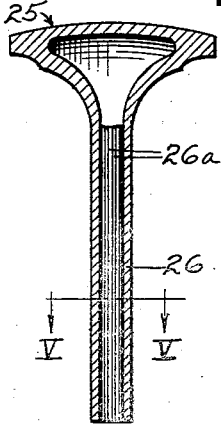
 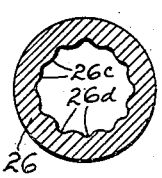 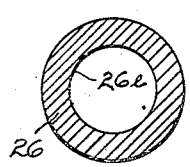
INVENTORS
John M. Kerwin
Samuel H. Norton

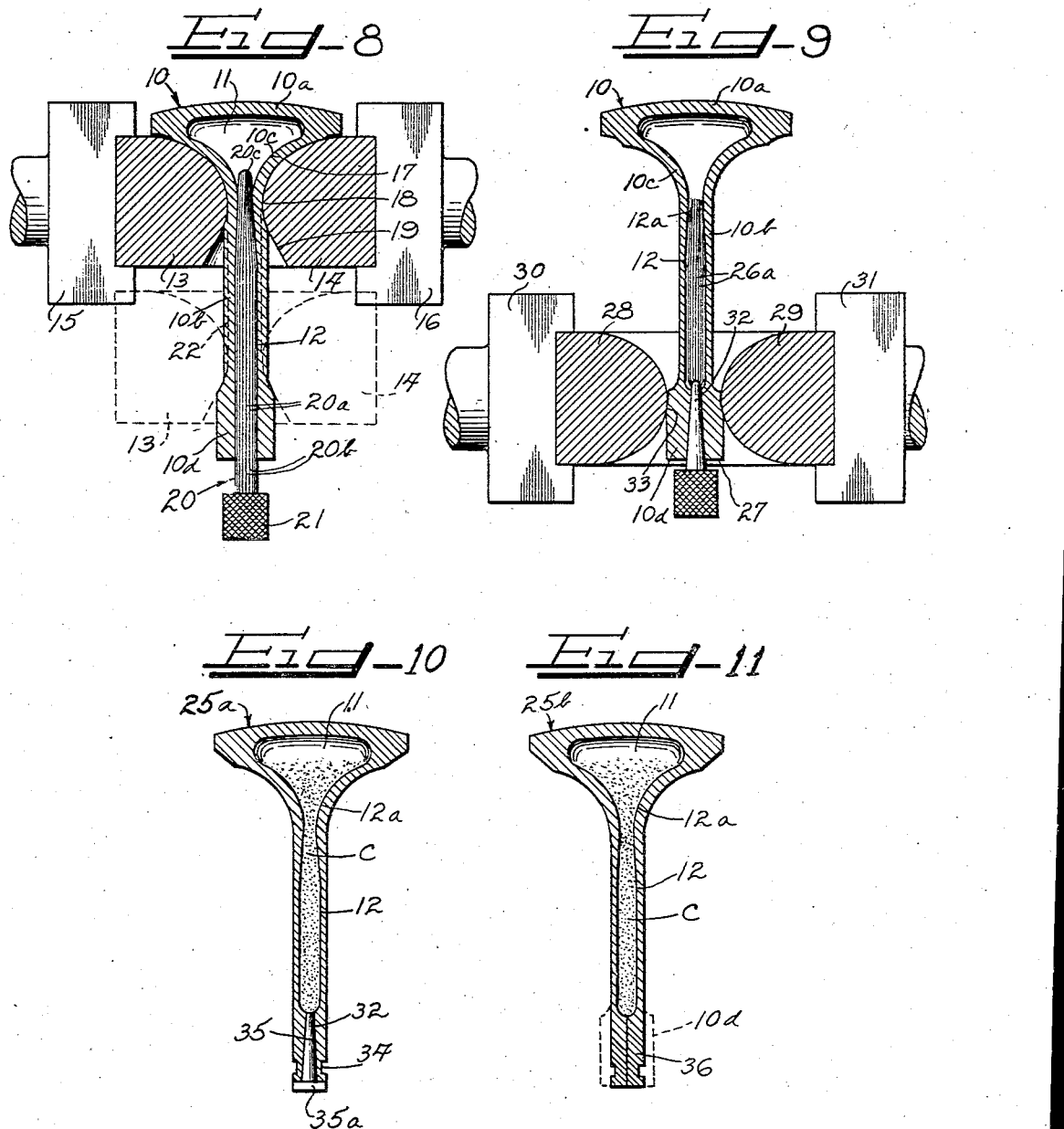

Patented Nov. 26, 1946

2,411,734

UNITED STATES PATENT OFFICE 2,411,734

COLD WORKED HOLLOW STEM VALVE

John M. Kerwin and Samuel H. Norton, Cleveland, Ohio, assignors to Thompson Products, Inc., Cleveland, Ohio, a corporation of Ohio Original application March 11, 1942, Serial No. 434,237. Divided and this application August 2, 1944, Serial No. 547,672

6 Claims. (Cl. 123—188)

This invention relates to the production of hollow stemmed poppet valves having cold worked stems of enhanced tensile strength.

More specifically the invention relates to the production of hollow poppet valves having cold worked internally ribbed stems.

This application is a division of our copending application, Serial No. 434,237, filed March 11, 1942, now U. S. Patent 2,367,783 granted January 23, 1945.

Hollow poppet valves are subjected, in operation, to severe tensile stresses and any circumferentially extending scratches in the hollow valve stem are very dangerous because they can readily form loci for fatigue cracks. Since it is highly desirable to decrease the weight of a hollow valve as much as possible, thin stem walls are used. These stem walls, nevertheless, must be capable of resisting the heavy tensile loads applied thereon, and it is an important feature of this invention to increase the strength of hollow valve stems by cold working. The stems can be internally ribbed during the cold working operation. The ribs extend longitudinally of the stem and obliterate or at least break up any circumferential scratches in the stem wall.

Cold working the valve stem metal will increase the tensile strength of the metal and the simultaneous internal ribbing of the stem will further increase its tensile strength. The ribs, in addition, serve as cooling fins to dissipate heat from the coolant in the hollow valve through the stem wall.

Thus the dangerous scratches and cracks are removed, a higher rate of heat transfer is obtained, thin stem walls can be used, and the metallurgical properties of the metal are improved.

It is, therefore, an object of this invention to provide a hollow stemmed poppet valve with an internally ribbed stem.

A further object of this invention is to provide hollow stemmed poppet valves having cold worked internally ribbed stems.

A still further object of this invention is to strengthen hollow poppet valves by cold working the same around a mandrel.

Another object of the invention is to improve the metallurgical characteristics of the metal in hollow valve stems by hammering the metal around a fluted mandrel inserted in the valve stem.

A still further object of the invention is to provide a lightweight hollow poppet valve with a relatively thin walled hollow stem of increased strength.

Other and further objects of the invention will be apparent to those skilled in the art from the following detailed description of the annexed sheets of drawings which, by way of preferred examples, illustrates several embodiments of the invention.

On the drawings:

Figure 1 is a plan view of hammer dies for acting on an inserted valve blank in accordance with this invention.

Figure 2 is a cross-sectional view along the line II—II of Figure 1, illustrating the start of the hammering operation.

Figure 3 is a view similar to Figure 2 illustrating the completion of the hammering operation.

Figure 4 is a longitudinal cross-sectional view of a hollow poppet valve blank made in accordance with this invention.

Figure 5 is an enlarged transverse cross-sectional view along the line V—V of Figure 4.

Figure 6 is a view similar to Figure 5 but illustrating another form of internally ribbed valve stem in accordance with this invention.

Figure 7 is a view similar to Figures 5 and 6, but illustrating a smooth continuous internal surface on the valve stem produced by cold working the stem around a smooth, polished mandrel in accordance with a still further modified embodiment of the invention.

Figure 8 is a view similar to Figures 2 and 3 but illustrating the hammering of the stem of a valve body having a nubbin end whereby the stem is cold worked from the valve neck to the nubbin only.

Figure 9 is a view similar to Figure 8 but illustrating the hammering of the nubbin end of the stem around a tapered pin to cold work the nubbin.

Figure 10 is a longitudinal cross-sectional view of a coolant filled and plugged valve made from a valve body that has been cold worked according to the process illustrated in Figures 8 and 9.

Figure 11 is a longitudinal cross-sectional view of a coolant filled and sealed valve made by inwardly collapsing the nubbin of a valve body that has been cold-worked as in Figure 8 and illustrating the nubbin in dotted lines.

As shown on the drawings:

In Figures 1 to 3 the reference character 10 designates generally a hollow poppet valve blank having a head 10a, a stem 10b, and an outwardly flaring neck 10c joining the stem and head. The head 10a has a mushroom-shaped cavity 11 therein and the stem 10b has a cylindrical hole 12 therethrough communicating with the head cavity 11.

The valve blank 10 can be formed by machining, forging or extruding, or in any other suitable manner.

The blank 10 is acted on by a pair of hammer dies 13 and 14 which are mounted in power-operated hammer holders 15 and 16 respectively.

The dies 13 and 14 cooperate to form a throat 17 for receiving the neck 10c of the blank. This throat 17 converges inwardly to a cylindrical inner surface 18 which envelopes the stem 10b of the blank and has a smaller diameter than the initial diameter of the stem when the dies are fully closed. The dies are then relieved as at 19 so that metal can flow from the cylindrical portion into the relieved portion and the die thus has an active cylindrical surface 18 for cold working the metal of the stem 10b.

The stem 10b, as pointed out above, has an internal cylindrical hole or bore 12 therethrough. In accordance with this invention a mandrel 20 is inserted in the bore 12. This mandrel 20 has longitudinally extending circumferentially spaced flutes 20a alternating with longitudinally extending ribs 20b. The outer diameter of the mandrel is such that it snugly engages the internal wall of the valve blank. The mandrel 20 can have an enlarged knurled knob 21 at the end thereof to facilitate insertion and removal of the mandrel into and out of the valve stem.

The valve blank 10, with the mandrel inserted therein as shown in Figure 2, is placed between the dies 13 and 14 with the neck 10c thereof resting on the die seat 17. The dies are then reciprocated to hammer the valve stem 10b. The valve can be rotated in the dies during the hammering process or, alternatively of course, the dies could be rotated around the valve.

The cylindrical working surface of the dies thins down the valve stem 10b as illustrated at 22 and presses the stem around the mandrel so that the interior wall thereof will enter the flutes 20a of the mandrel thereby forming longitudinal ribs on the interior wall of the stem.

The entire length of the stem 10b is hammered by movement of the valve during the hammering operation away from the seat 17 as illustrated in Figure 3. Alternately, of course, the dies could be moved downwardly along the valve stem.

The hammering operation is effected at temperatures below the recrystallization range of the valve metal. Preferably the hammering is effected when the valve blank is at room temperatures and after the blank has been sufficiently formed so that it need not again be reheated to forging temperatures. As a result the valve stem 10b is thinned down and cold worked.

Upon completion of the hammering along the entire length of the valve stem 10b the mandrel 20 is removed from the stem and a valve blank 25 shown in Figure 4 is produced. The valve blank 25 has a cold worked stem 26 with a relatively thin wall. The interior of the stem 26 has longitudinally extending ribs 26a best shown in Figure 5. These ribs 26a alternate with grooves or serrations 26b.

The longitudinally extending ribs 26a materially strengthen the stem wall and, at the same time, act as cooling fins for dispersing heat from coolant which is sealed in the hollow valve upon completing the production of a valve from the blank 25. Cooling material such as sodium is inserted into the hollow valve and the end of the valve stem is sealed by welding on a plug or a cap (not shown).

If desired the valve body 10 can have the stem 10b thereof formed with an enlarged nubbin end 10d as shown in Figures 8 and 9 which is capable of being inwardly deformed to cooperate with a closure pin for plugging the valve as shown in Figure 10, or is capable of being inwardly collapsed to seal the valve as shown in Figure 11.

As shown in Figure 8 the valve stem 10b is cold hammered around a ribbed mandrel 20 by the dies 13 and 14 to thin down the stem as at 22 in the same manner described in connection with Figures 2 and 3. However the hammering is not permitted to progress to the end of the valve stem but is stopped at the nubbin as shown in the dotted line position of the dies. The stem 10b is thus cold worked from the neck 10c to the nubbin 10d.

As also shown in Figure 8, the mandrel 20 can have a tapered ribbed end 20c fitting into the throat portion of the valve body between the head cavity 11 and the stem hole 12. This permits the formation of a tapered ribbed throat 12a in the valve. The throat defining wall, due to the tapered throat, is somewhat thicker than the walls of the valve stem proper.

After cold working the stem down to the nubbin 10d as shown in Figure 8, the nubbin is next cold worked around a tapered pin 27 by a pair of hammer dies 28 and 29 carried in power holders 30 and 31 as illustrated in Figure 9. The pin 27 is preferably not ribbed but has a smooth continuous tapered surface of circular cross section for shaping a smooth tapered hole 32 through the nubbin with the small end of the hole entering the larger and ribbed stem hole 12. The hammer dies 28 and 29 work down the nubbin 33 to a smaller diameter and collapse the nubbin inwardly around the pin. The hammering is effected along the entire length of the nubbin and the finished cold worked nubbin thus has a tapered hole 32 therethrough of lesser diameter than the hole 12 of the valve stem. The outside diameter of the cold worked and partially collapsed nubbin may be larger than the outside diameter of the stem but it is reduced to stem size by grinding. A valve spring retainer groove 34 (Figure 10) can also be ground or cut into the cold worked and ground nubbin end of the stem.

A finished valve 25a is made from the cold worked tapered hole nubbin type of valve body by grinding and polishing the body to size, by inserting a coolant "C" such as sodium, into the head and steam cavities, and by driving a tapered sealing pin 35 into the hole 32. The pin 35 can have a head 35a forming the bottom of the valve stem.

Instead of cold working the nubbin 10d around a tapered pin 27, a valve 25b as shown in Figure 11 can be made from a nubbin type of valve body by hammering the nubbin 10d completely shut after the coolant C has been inserted into the body provided that the valve metal is sufficiently workable to permit complete collapsing of the nubbin. This will form a solid sealed end 36 on the valve stem.

The grooves 26b between the ribs 26a of the valves 25, 25a and 25b serve to break up any circumferentially extending defects in the interior of the stem. For example, even though the bore 12 of the blank 10 is carefully polished, some circumferentially extending scratches may remain in the interior stem wall. These scratches are highly dangerous because they form loci for fatigue cracks when the valve is subjected to heavy tension loads as in operation. By pressing the stem around the fluted mandrel these scratches are either completely worked out of the metal or at least are broken up into short lengths because they never extend as deep as the grooves 26b and these grooves will thus divide the scratches. Any remaining short scratches are relatively unobjectionable.

The longitudinally extending flutes and ribs of the mandrel can have many forms and configurations. For example, as shown in Figure 6, the mandrel could be so shaped as to form more pronounced ribs 26c in the interior wall of the stem separated by rounded flutes 26d.

In still another embodiment of the invention the mandrel 20 can have a smooth, continuous polished cylindrical surface which will form a smooth, continuous, cylindrical surface 26e in the interior of the stem as shown in Figure 7.

In all embodiments of the invention the valve stem is cold-worked around a mandrel to improve the metallurgical characteristics of the stem metal. In the preferred embodiments of the invention the interior surface of the valve stem is internally ribbed during the cold-working operation.

In all embodiments of the invention, however, the poppet valves have materially strengthened hollow stems.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A hollow stemmed poppet valve having a longitudinally extending inwardly deformed internal stem wall with the deformations forming longitudinal reinforcing ribs for the wall.

2. A hollow poppet valve having a longitudinally ribbed interior hollow stem wall, said interior stem wall having the ribs thereof separated by longitudinally extending grooves, said ribs adapted to act as cooling fins for dispersing heat.

3. A poppet valve having an enlarged head with a mushroom-shaped cavity therein, a converging neck portion, and a hollow cylindrical stem extending from the small end of the neck portion, said stem having an internal cavity along the length thereof communicating with the head cavity and reinforcing longitudinally extending ribs along the length of the stem cavity.

4. A hollow stemmed poppet valve having a reinforced unitary inner stem wall with alternate longitudinal extending grooves and inwardly extending cold worked ribs.

5. A hollow stemmed poppet valve having a reinforced longitudinally ribbed inner stem wall, said longitudinal ribs being adapted to act as cooling fins for dispersing heat.

6. A poppet valve having a cold worked hollow stem, said hollow stem having inwardly protruding deformations on its inner wall, said deformations being alternate longitudinal extending grooves and ribs, said grooves and ribs adapted to reinforce the stem and being adapted to act as cooling fins for dispersing heat away from the head of the poppet valve.

JOHN M. KERWIN.
SAMUEL H. NORTON.